Dec. 29, 1936.  H. A. CENTERVALL  2,065,513
STEERING DEVICE FOR MOTOR VEHICLES
Filed Dec. 5, 1934
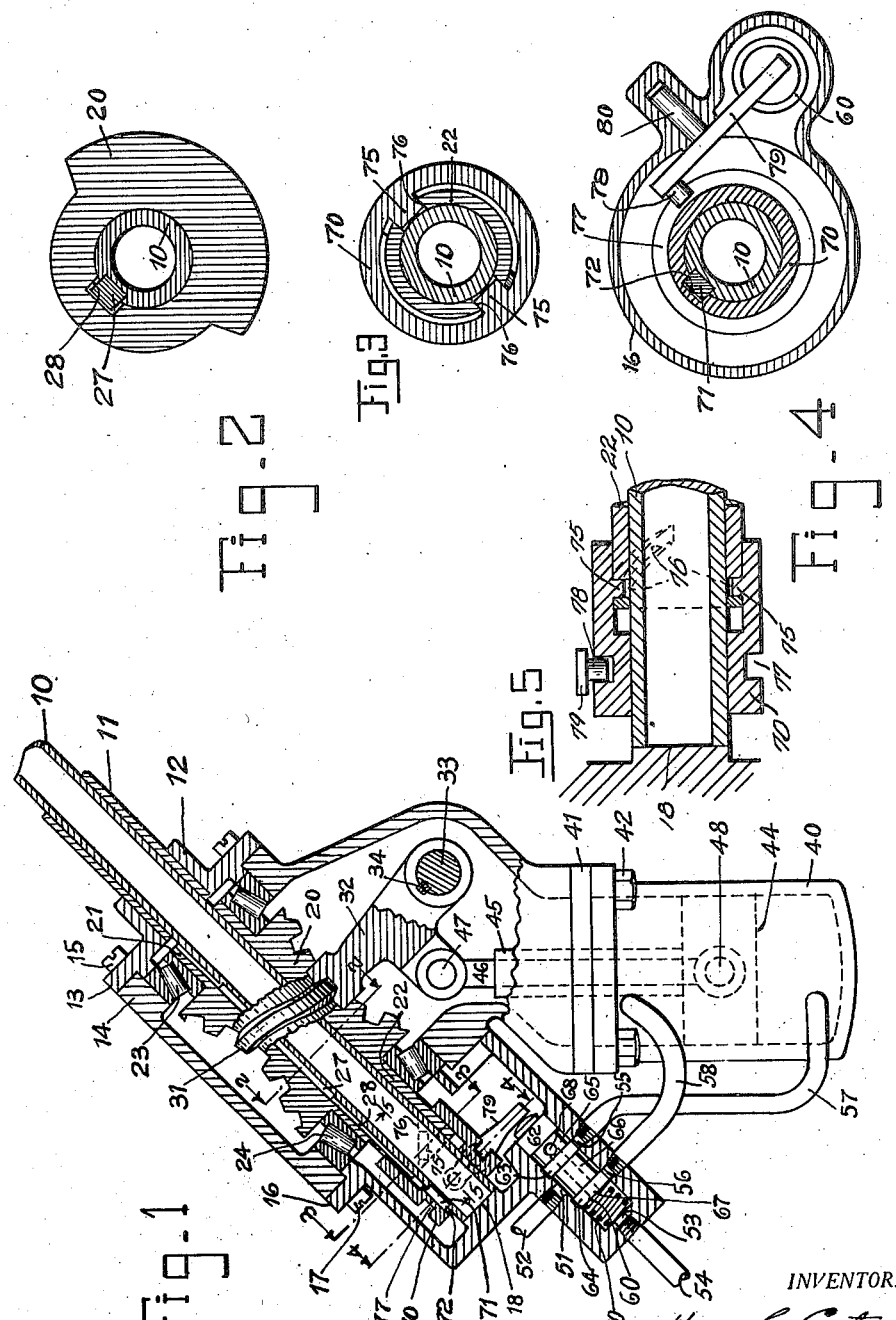
INVENTOR.
Hugo A. Centervall
BY
Pennie, Davis, Marvin and Edmonds
ATTORNEY.

Patented Dec. 29, 1936

2,065,513

UNITED STATES PATENT OFFICE 2,065,513

STEERING DEVICE FOR MOTOR VEHICLES

Hugo A. Centervall, Brooklyn, N. Y., assignor to Manly Corporation, New York, N. Y., a corporation of Delaware Application December 5, 1934, Serial No. 756,027

6 Claims. (Cl. 180—79.2)

This invention relates to control mechanisms for power operated devices and more particularly to control mechanisms for power devices employed to actuate the steering apparatus of a motor vehicle.

The principal object of the invention is to provide an improved mechanism of this class that is simple, compact and reliable in action. A further object is to provide an improved mechanism of this class in which manual power may be transmitted to the steered wheels without imposing any load whatsoever upon the control mechanism. A more specific object is to provide an improved mechanism of this class in which the steering shaft directly actuates the control mechanism to cause the power apparatus to operate in response to movement of the steering wheel, the opposite actuation of the control mechanism being produced by movement of the steering mechanism thus produced by the power apparatus. Other objects will appear from the following description of the illustrative embodiment of the present invention shown in the accompanying drawing.

The invention is suitable for use in controlling the operation of any preferred type of power apparatus such as those actuated pneumatically, electrically, mechanically or hydraulically. I have, however, chosen to illustrate the invention in connection with an hydraulic steering apparatus for a conventional automobile, but its use is not limited to this type of power mechanism or for this particular purpose.

In the accompanying drawing:

Fig. 1 is a side view, partly in vertical section and partly diagrammatic, showing a preferred embodiment of the invention as applied to the steering apparatus for a conventional automobile.

Fig. 2 is an enlarged detailed sectional view taken along the line 2—2 of Fig. 1 and showing the means employed for operatively connecting the steering shaft with the worm member.

Fig. 3 is an enlarged detailed sectional view taken along the line 3—3 of Fig. 1 and showing the operative connections between a portion of the control mechanism and the worm member.

Fig. 4 is an enlarged detailed sectional view taken along the line 4—4 of Fig. 1 and showing other details of construction, and Fig. 5 is a longitudinal section taken on the line 5—5 of Fig. 1 and drawn to the same scale as Fig. 3.

Referring now to Fig. 1 of the drawing, the steering gear includes the usual rotatable steering shaft 10 to whose upper end is attached the usual steering wheel, not shown, by which the steering shaft 10 is manually turned to control the steering of the vehicle. The steering shaft 10 is enclosed within the usual hollow steering post 11 whose lower end is received within and appropriately fastened in the bore of the hub 12 on the top cover member 13 which closes the upper end of the steering gear casing 14 and on which it is held in place as by the screws 15. The lower end of the steering gear casing 14 is closed by bottom cover member 16 which is fastened to said steering gear casing 14 as by screws 17. The lower end of the steering shaft 10 extends into the steering gear casing 14 and is here shown as rotatably supported at 18 by the bottom cover member 16, upon which the steering shaft 10 is held in place by any suitable means, not shown.

Within the steering gear casing 14 is the worm member 20, hereinafter termed the "worm," which is provided with a central bore for receiving the steering shaft 10. The ends of the worm 30 are formed with a pair of hubs 21 and 22 respectively which are received within the inner races of a pair of bearing members 23 and 24 respectively. The outer races of the bearings 23 and 24 are received within appropriate bores formed in the steering gear casing 14 which in turn is supported upon the frame or other portion of the vehicle in any suitable manner. The arrangement is such that the worm 20 is freely rotatable in the bearing members 23 and 24 but is securely held against longitudinal movement with respect to said bearings 23 and 24 and with respect to the steering shaft 10.

In order that manual power may be transmitted from the steering wheel to the other portions of the steering mechanism the worm 20 is operatively connected with the steering shaft 10 as by a longitudinal key 27 which is received within a longitudinal keyway formed in said steering shaft 10 and in a longitudinal keyway 28 formed in the worm 20, as shown in Figs. 1 and 2. The longitudinal keyway in the steering shaft 10 may be of any preferred length but as is here shown is substantially the same length as the key 27 in order to hold said key against longitudinal movement. The keyway 28 in the worm 20 may likewise be of any preferred length but for ease in assembling is here shown as extending the entire length of said worm 20. The key 27 is likewise of substantially the same width as the keyway in the shaft 10 but the keyway 28 is, however, of greater width than the key 27, as clearly shown in Fig. 2. The arrangement is such that the shaft 10 is keyed to rotate the worm 20 while permitting a limited rotational movement of one of these parts with respect to the other.

The outer surface of the worm 20 is formed with the usual worm or helical thread 31 which meshes with the usual sector 32. The sector 32 is keyed to a cross shaft 33 by the key 34 and said cross shaft 33 is presumed to be operatively connected in the usual manner with a conventional front road wheel assembly of an automobile so that clockwise rotation of said cross shaft 33 moves the front road wheels so as to cause the vehicle to turn toward the left, while counterclockwise rotation of said cross shaft 33 moves these wheels so as to cause the vehicle to turn toward the right.

The power apparatus in the present embodiment is hydraulically operated and as here diagrammatically shown comprises a cylinder 40 closed at its lower end and provided with a cover member 41 which closes its upper end. The cylinder assembly is securely fastened as by the screws 42 to the steering gear casing 14 in which a suitable opening is provided. Slidably fitted within the cylinder 40 is a double acting piston 44 from the upper end of which projects a tubular stuffing box 45. The stuffing box 45 extends through an appropriate opening in the cover 41 and is of such length as to close said opening in all positions of the piston 44. The arrangement is such that the stuffing box 45 is free to move lengthwise through the opening in the cover 41 while forming a substantially fluid tight fit therewith, appropriate packing being used to prevent leakage. Within the stuffing box 45 is a connecting rod 46 whose upper end is pivotally connected with the sector 32 as at 47 and whose lower end is likewise pivotally connected with the piston 44 as at 48.

The operation of the hydraulic power apparatus is regulated by the movement and position of a control valve 60. In the present instance the control valve 60 is slidably fitted within a valve bore 50 formed in the bottom cover member 16 of the steering gear casing. The valve bore 50 is provided with an inlet or high pressure port 51 which is suitably connected with the source of pressure fluid, not shown, as by the pipe 52. The lower end of the valve bore 50 is provided with an exhaust opening 53 which is appropriately connected with the return or exhaust pipe 54, which in turn is connected with the reservoir, not shown. The valve bore 50 is also provided with a pair of ports 55 and 56, respectively, which are located on either side of the high pressure port 51. The port 55 is suitably connected with the pipe 57 which leads to and connects with the lower end of the cylinder 40. Similarly the port 56 is connected with the pipe 58 which leads to and connects with the upper end of the cylinder 40.

The control valve 60 is provided with three heads, 62, 63, and 64, respectively, which are separated by the reduced portions 65 and 66, respectively. The heads 63 and 64 are adapted to cover the ports 55 and 56, respectively, when the control valve 60 is in its neutral position, as shown in Fig. 1. A longitudinal passage 67 extends through the control valve 60 from its end adjacent the exhaust pipe 54 to the reduced portion 65 where it connects with a radial passage 68. When the control valve 60 is moved out of its neutral position and toward the exhaust pipe 54 the port 56 is connected with the reduced portion 66 of said control valve 60 and hence pressure fluid is admitted to the upper end of the cylinder 40; the port 55 is then connected with the reduced portion 65 and the fluid is free to pass out of the lower end of the cylinder 40 through the connecting passages and into the return or exhaust pipe 54. Similarly, when the control valve 60 is moved out of its neutral position and away from the exhaust or return pipe 54 pressure fluid is admitted to the lower end of the cylinder 40 and the upper end of said cylinder 40 is connected with the return pipe 54.

The movement and position of the control valve 60 are effected and controlled by the relative movement and position of the steering shaft 10 and the worm 20. In the present embodiment there is provided a valve actuating member 70, hereinafter termed the "actuator," which is responsive to relative rotational movement of the steering shaft 10 with respect to the worm 20, and is likewise responsive to relative rotational movement of said worm 20 with respect to said steering shaft 10. For this purpose the actuator 70 is operatively connected with the steering shaft 10 by means of a key 71 which is received in an appropriate longitudinal keyway in the lower end of said steering shaft 10 and in the keyway 72 formed in the bore of said actuator 70, as clearly shown in Fig. 4. The arrangement is such that the actuator 70 is keyed for simultaneous rotation with the steering shaft 10, but is freely slidable lengthwise thereon, thus permitting said actuator 70 to actuate the control valve mechanism, as will be later explained. The actuator 70 is also operatively connected with an extension of the hub 22 of the worm 20 and in the present embodiment is shown as provided with a pair of suitable helical thread segments 75 formed within the bore of said actuator 70 and adapted to engage a pair of similar helical channels 76 formed on the outer surface of the lower end of said hub 22, as indicated by the dotted lines of Fig. 1 and as shown in Fig. 3.

The outer surface of the actuator 70 is provided with an annular groove 77 which engages a pin 78 formed on one end of a lever 79 which is pivotally supported as at 80 in the bottom cover member 16 of the steering gear casing 14, as shown in Fig. 4. The other end of the lever 79 is adapted to slidably bear against the adjacent end of the control valve 60 which is adapted to be moved lengthwise into valve bore 50. As viewed in Fig. 1, downward movement is effected by downward pressure exerted by the lever 79, while upward movement is effected by the spring 82 acting against the lower end of the valve bore 50 and the adjacent end of said control valve 60. The spring 82 is adapted to move the control valve 60 upwardly as far and as rapidly as permitted by the lever 79. The spring 82 also serves to continuously hold the parts in proper position with respect to each other; that is, the control valve 60 is held against the adjacent end of the lever 79 and the actuator 70 is held in proper position with respect to the steering shaft 10 and the hub 22 of the worm 20.

When it is desired to steer the vehicle toward the right the driver turns the steering wheel in a clockwise direction which imparts like motion to the steering shaft 10 and the actuator 70. No motion is initially imparted to the worm 20 because the keyway 28 is of greater width than the key 27. As the actuator 70 begins to rotate with the steering shaft 10 the thread segments 75, acting against the helical grooves 76 in the hub 22 of the worm 20, cause said actuator 70 to be moved upwardly, thus causing the pin 79 to swing on its pivot 80 and to move the control valve 60 downwardly, as viewed in Fig. 1. Pressure fluid is thus admitted to the upper end of the cylinder 40, and the lower end of said cylinder 40 is connected with the return pipe 54, as hereinbefore explained. The proportion of the parts is made such that this movement of the control valve 60 occurs before the steering shaft 10 has rotated a distance sufficient to bring the key 27 against the adjacent side of the keyway 28. The pressure fluid thus admitted to the upper end of the cylinder 40 acts against the piston 44 and moves piston 44 downwardly, the connecting rod 46 and the sector 32 causing the cross shaft 33 to turn in a counter-clockwise direction as viewed in Fig. 1. As hereinbefore explained, the cross shaft 33 is presumed to be connected with the front road wheels of the vehicle so that this counterclockwise rotation of said cross shaft 33 causes said wheels to swing so as to turn the vehicle toward the right.

Movement of the piston 44 and its connected parts continues as long as the driver continues to turn the steering wheel in a clockwise direction. As the sector 32 moves downwardly, however, it reacts against the worm thread 31, causing said worm 20 to rotate in a clockwise direction. The position of the actuator 70 is therefore determined by the relative speeds and directions of rotation of the steering shaft 10 and the worm 20 and this position in turn controls the position of the lever 79 and the control valve 60.

There is consequently no axial movement of the actuator 70 with respect to the steering shaft 10, as long as the steering wheel is turned in a clockwise direction at a rate which imparts to the steering shaft 10 a speed corresponding to the rate of rotation of the worm 30 as produced by the sector 32. Hence there is no movement of the control valve 60 and the piston 44 continues its downward movement. But whenever the speed of rotation of the worm 20 exceeds the speed of rotation of the steering shaft 10, as when the driver turns the steering wheel more slowly or ceases to turn it, the helical grooves 76 in the hub 22 of the worm 20 react against the thread segments 75 of the actuator 70 thus producing downward axial movement of the actuator 70. As the actuator 70 moves downwardly it causes the lever 79 to swing on its pivot 80 so as to raise the end of said lever 79 which bears against the control valve 60, as viewed in Fig. 1. The spring 82 then immediately moves the control valve 60 upwardly, as viewed in Fig. 1, and toward its neutral position, and movement of the piston 44 and its connected parts ceases.

To steer the vehicle toward the left the driver turns the steering wheel in a counter-clockwise direction and the operation of the controls, the piston 44 and its connected parts is reversed. Pressure fluid is now admitted to the lower end of the cylinder 40 and fluid is exhausted from the upper end of said cylinder.

Steering is thus effected by power and it is necessary for the driver to expend only enough energy to move the control members, and this is negligible. While the movements of the various parts have been described progressively, it will be understood that these movements take place so rapidly that they are substantially instantaneous.

There is a corresponding definite vertical position of the piston 44 for every position of the steering control members and the device operates to continuously maintain this corresponding position. For purposes of illustration, let us assume that the parts are in the position shown in Fig. 1, that the steering shaft 10 is stationary, and that the piston 44 is displaced upwardly as because of leakage from the upper end of the cylinder 40, for example. As this displacement of the piston 44 commences the sector 32 is also moved upwardly and, acting against the worm thread 31, causes the worm 20 to rotate in a counter-clockwise direction, as viewed from the upper end of the steering shaft 10. The helical grooves 76 thus react against the thread segments 75 of the actuator 70, and as said actuator 70 is held against rotation by the steering shaft 10, this reaction of said grooves 76 against said threads 75 causes the actuator 70 to move upwardly, with respect to the steering shaft 10. This upward movement of the actuator 70 causes the control valve 60 to be moved downwardly, as viewed in Fig. 1, as hereinbefore explained. Pressure fluid is thus admitted to the upper end of the cylinder 40 which almost instantaneously moves the piston 44 downwardly and restores it to its proper position, the control valve 60 likewise being restored to its neutral position by the follow-up action already described. It is, therefore, impossible for the piston 44 to be displaced any material distance away from its proper position and any displacement that may occur is almost instantaneously rectified.

If the source of pressure fluid should fail, or if the power apparatus should for any reason fail to respond, steering may be effected manually by the same movement of the same controls already described for power steering, although the driver must obviously exert more energy. In this case the operation of the power control mechanism is initially the same as for power steering, but when the power apparatus fails to respond the steering shaft 10 continues to rotate the short distance until the key 27 comes into contact with the adjacent side of the longitudinal groove 28 in the bore of the worm 20. Manual power from the steering wheel may then be transmitted through the worm 20, the sector 32 and the cross shaft 33 to the front road wheels of the vehicle in the same manner as in a conventional steering gear adapted for manual operation only. When steering is done manually the entire resulting load is taken by bearing members 23 and 24, respectively, the key 28, the worm member 20 and, of course, the steering gear casing 14. No work of steering is done by the actuator 70, the lever 79 or the control valve 60, at any time, regardless of whether steering is effected by power or manually; the only pressure ever exerted on these parts is the very small amount necessary to effect their movement and which is determined by the spring 82, their function being limited to control of the operation of the hydraulic apparatus.

It is to be understood that the above is merely an exemplifying disclosure and that changes may be made in the apparatus without departing from applicant's invention which is defined in the appended claims. Thus, for example, the steering gear illustrated herein is of the worm and sector type, but if desired, steering gears of the cam and lever type, of the screw and nut type and the like may be used. Also the worm member illustrated herein is of the conventional "hourglass" type. This worm may have either a constant or a varying pitch. Moreover, worm members having a uniform diameter and of either constant or varying pitch may be employed. It is to be understood, therefore, that the terms "worm" or "worm member" as used in this specification and the appended claims, are intended to include the driving member of a steering gear of these and other equivalent types.

I claim:

1. In a device of the character described, a manually rotatable shaft, a driving member rotatable with and having limited movement with respect to said shaft, a driven member coacting with said driving member, power operated means for actuating said driven member, and control mechanism for said power-operated means, said control mechanism comprising an actuating member operatively connected with said shaft and with said driving member to be actuated when said shaft moves with respect to said driving member.

2. In a device of the character described, a manually rotatable shaft, a driving member rotatable with and having limited rotational movement with respect to said shaft, a driven member coacting with said driving member, power-operated means for actuating said driven member, and control mechanism for said power-operated means, said control mechanism comprising an actuating member rotatable with said shaft and axially movable thereon and having a threaded connection with said driving member to impart axial movement to said actuating member when said shaft rotates with respect to said driving member.

3. In a device of the character described, a manually rotatable shaft, a worm member rotatable with and having limited movement with respect to said shaft, a driven member coacting with said worm, power-operated means for actuating said driven member, and control mechanism for said power-operated means comprising an actuating member directly actuated by said shaft to cause the operation of said power operated means in response to rotation of said shaft, said actuating member being oppositely actuated by said worm in response to the operation of said power-operated means.

4. In a device of the character described, a manually rotatable shaft, a worm rotatable with and having limited movement with respect to said shaft, said worm having bearing members for rotatably supporting the same and a hub projecting beyond one of said bearing members, a driven member coacting with said worm, power-operated means for actuating said driven member, and control mechanism for said power-operated means actuated by relative movement between said shaft and said worm, said control mechanism comprising an actuating member operatively connected with said shaft and with said hub of said worm and movable responsive to relative movement between said hub and said shaft.

5. In a device of the character described, a manually rotatable shaft, a driving member rotatable with and having limited rotational movement with respect to said shaft, a driven member coacting with said driving member, power-operated means for actuating said driven member, and control mechanism for said power-operated means, said control mechanism comprising an actuating member arranged for rotation with said shaft but slidable thereon and slidably responsive to relative movement between said shaft and driving member.

6. In a steering device for motor vehicles, a manually rotatable steering shaft, a driving member rotatable with and having limited rotational movement with respect to said shaft, a driven member coacting with said driving member, a fluid pressure cylinder having a piston element operatively connected to said driven member to actuate the same, a valve for controlling the admission and discharge of operating fluid to and from said cylinder, and a member for actuating said valve arranged for rotation with the steering shaft but slidable with respect thereto and slidably responsive to relative rotational movement between said shaft and said driving member.

HUGO A. CENTERVALL.